United States Patent [19]
Haddad, Jr.

[11] Patent Number: 5,957,523
[45] Date of Patent: Sep. 28, 1999

[54] TRUCK COVER SYSTEM HAVING HOLD DOWN TENSIONING APPARATUS

[75] Inventor: Edward N. Haddad, Jr., Worcester, Mass.

[73] Assignee: Pioneer Consolidated Corporation, North Oxford, Mass.

[21] Appl. No.: 09/028,835

[22] Filed: Feb. 24, 1998

[51] Int. Cl.⁶ .................................................. B60P 7/04
[52] U.S. Cl. ........................................................ 296/98
[58] Field of Search ............................................... 296/98

[56] References Cited

U.S. PATENT DOCUMENTS

| | | |
|---|---|---|
| 3,549,197 | 12/1970 | Sibley . |
| 4,050,734 | 9/1977 | Richard . |
| 4,341,416 | 7/1982 | Richard . |
| 4,516,802 | 5/1985 | Compton . |
| 4,740,029 | 4/1988 | Tuerk . |
| 5,031,955 | 7/1991 | Searfoss . |

OTHER PUBLICATIONS

"Do it Right with Roll–Rite," Roll–Rite Corporation, Dec. 1996.

*Primary Examiner*—Gary C. Hoge
*Attorney, Agent, or Firm*—Weingarten, Schurgin, Gagnebin & Hayes LLP

[57] ABSTRACT

A tensioning device for use with a flexible cover on an open top receptacle such as a dump truck maintains the cover in a taut position and minimizes billowing of the cover during deployment, refurling, or transit. Spring biased arms attached to a tensioning bar urge said cover towards the top edge of said receptacle, keeping the tensioned cover proximate to the top edge of the receptacle sides. The open top of the receptacle is thereby closed during transit as the cover remains in substantial communication with the top edge of the receptacle and therefore resistant to billowing and wind agitation.

15 Claims, 7 Drawing Sheets

TRUCK COVER SYSTEM HAVING HOLD DOWN TENSIONING APPARATUS

BACKGROUND OF THE INVENTION

The present invention relates to truck covers and more particularly to tensioning apparatus to aid in securing such a cover during transit.

Open top receptacles such as those used on dump trucks and roll-off trash dumpsters often contain loads which can be easily agitated by forces from bumpy roads, external winds, and the airstream created by vehicular movement. Accordingly, a flexible cover is often secured on top of these receptacles to shield the contents. Since such receptacles are often up to 40 feet long and as wide as the vehicle upon which they are carried, the covers tend to be large and unwieldy. Some form of mechanical assistance is often used to manipulate and secure such covers.

Simple truck cover manipulators are often comprised of a pair of pivoting arms connected to a crossbar perpendicular to the long dimension of the receptacle. The crossbar can then draw such a cover longitudinally from a rolled or furled position across the open top, as disclosed in U.S. Pat. No. 4,157,202, issued to Applicant. However, the rolled or furled position of the cover is usually on a cab shield, which is a horizontal surface elevated with respect to the top edge of the receptacle. As the cover is drawn over the load, usually in an arcuate path, there is a tendency for wind which may flow across or beneath the cover to cause billowing and flapping. After the drawn cover is secured, elevated mounting position of the cover on the raised cab shield continues to promote a persistent void under the cover during transit. Such a void allows wind to continue to flow beneath the cover and cause further billowing and flapping, accelerating cover wear and causing excessive stress in the cover manipulator mechanism. Cover wear and fatigue in the cover manipulator members also degrades the effectiveness of the cover in securing the load.

Previous advancements in the methods used to minimize wind agitation of the cover during deployment and transit include flush mounted covers and telescoping arms to linearize the arcuate path of the covering mechanism, as disclosed by U.S. Pat. Nos. 5,179,991 and 5,340,187 respectively, both issued to Applicant.

Flush mounted covers typically use guides mounted on the lip along the top longitudinal edges of the receptacle. Often, however, the sides of the receptacle become bowed from the outward force of the load within the receptacle such that the guides are no longer parallel. Also, the guides on the lip of the receptacle tend to be subject to clogging and physical damage from being struck by dense loads and heavy equipment during loading. Further, flush mounted covers require that the entire load be below the upper edge of the receptacle to allow sufficient clearance for closing the cover. Finally, flush mounted covers require that the top of all sides be at the same height, and therefore is unsuited to a receptacle with a raised cab shield at the forward edge.

Telescoping arms to draw the cover over the load require complex moving parts and sophisticated controls for the mechanical arms, which tends to increase production and maintenance costs. They also share the problem of load clearance, as the entire load must be below the path of the closing arms.

Other methods to aid in securing the cover include a second crossbar and pair of arms attached to the main arm apparatus, as suggested by U.S. Pat. No. 5,031,955, issued to Searfoss, and a second crossbar to adapt the cover to different height receptacles, as suggested by U.S. Pat. No. 5,388,882, issued to Russell.

The Searfoss approach, however, increases the fatigue on the main pair of arms by mounting the second pair of arms thereto. Further, as the second pair of arms are almost as long as the main pair, they are likewise subject to fatigue as wind agitates the cover.

The Russell approach directs the forward edge of the cover such that it is lower than the receptacle on which the cover rests. Accordingly, Russell uses a manual valve control tied into the vehicle's air system to effect operator assisted manipulation to match the height to the receptacle to be covered. Therefore, such apparatus is not a stand-alone automated mechanism since it requires manual operator intervention and need be powered by a host vehicle.

Therefore, the prior art fails to provide a mechanically simple, independently mounted, flexible cover mechanism which enables the complete and secure coverage of loads which may extend above the body of the receptacle to be covered.

BRIEF SUMMARY OF THE INVENTION

A tensioning device for use with a flexible cover on an open top receptacle such as a dump truck maintains the cover in a taut position and minimizes billowing of the cover during deployment, refurling, or transit. Spring biased arms attached to a tensioning bar urge said cover towards the top edge of said receptacle, keeping the tensioned cover proximate to the top edge of the receptacle sides. The open top of the receptacle is thereby closed during transit as the cover remains in substantial communication with the top edge of the receptacle and therefore resistant to billowing and wind agitation.

The present embodiment works in conjunction with pivoting arms, either telescoping or of fixed length, to tension the cover during deployment, and to dispose the forward edge of the cover on the top edge of the truck sides to eliminate the void caused by cab shield mounting of the cover roller. In this embodiment, the apparatus comprises a pair of parallel arms each connected to opposite ends of a perpendicular tensioning bar at one end and to a spring loaded pivot point at the other end. The spring loaded pivot points are affixed to a location such as opposite sides of the receptacle or the truck body to allow rotational movement of the tensioning bar around the pivot points such that the tensioning bar is in slidable communication with the cover as the cover is drawn across the load. The pivot points and the length of the parallel arms are selected such that the range of movement of the tensioning bar allows travel through the area substantially defined by a path between a point proximate to the retracted position of the cover and a point proximate to the top edge of the receptacle. The spring is such that in the tensioned position the tensioning bar is at the retracted position of the cover. As the cover is drawn over the load, the tensioning bar travels rotationally towards the top edge of the receptacle, slidably communicating with the cover as the cover is drawn over the load. By disposing the cover towards the receptacle at the top edge most proximate to the retracted position of the cover, tension is maintained in the cover surface at the upper edge of the receptacle.

BRIEF DESCRIPTION OF THE SEVERAL VIEWS OF THE DRAWING

The invention will be more fully understood by reference to the following description in conjunction with the following drawings of which.

DETAILED DESCRIPTION OF THE INVENTION

Figure 1:
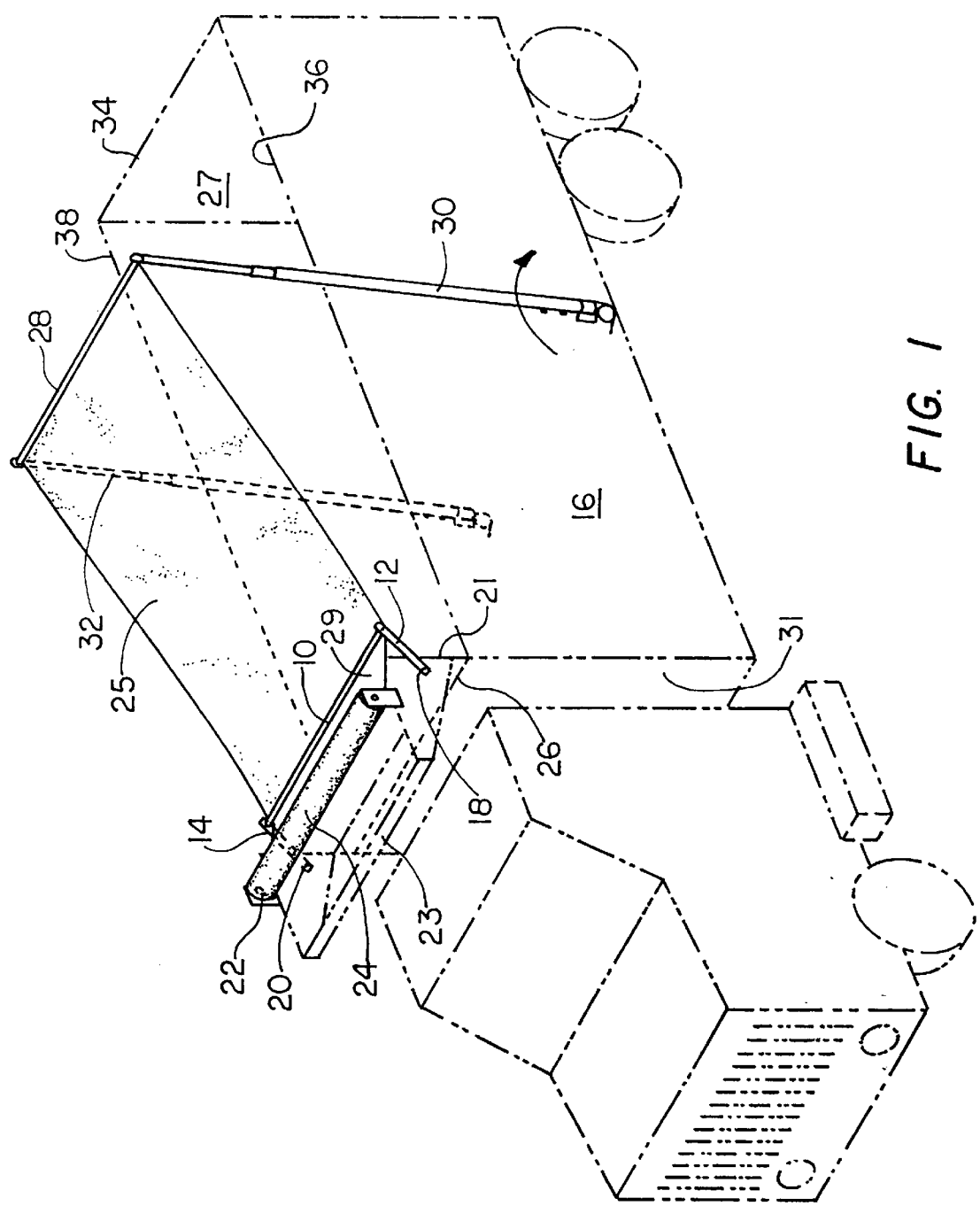
FIG. 1 is a perspective angle view of the tensioning apparatus during cover deployment over a receptacle.
Figure 2:
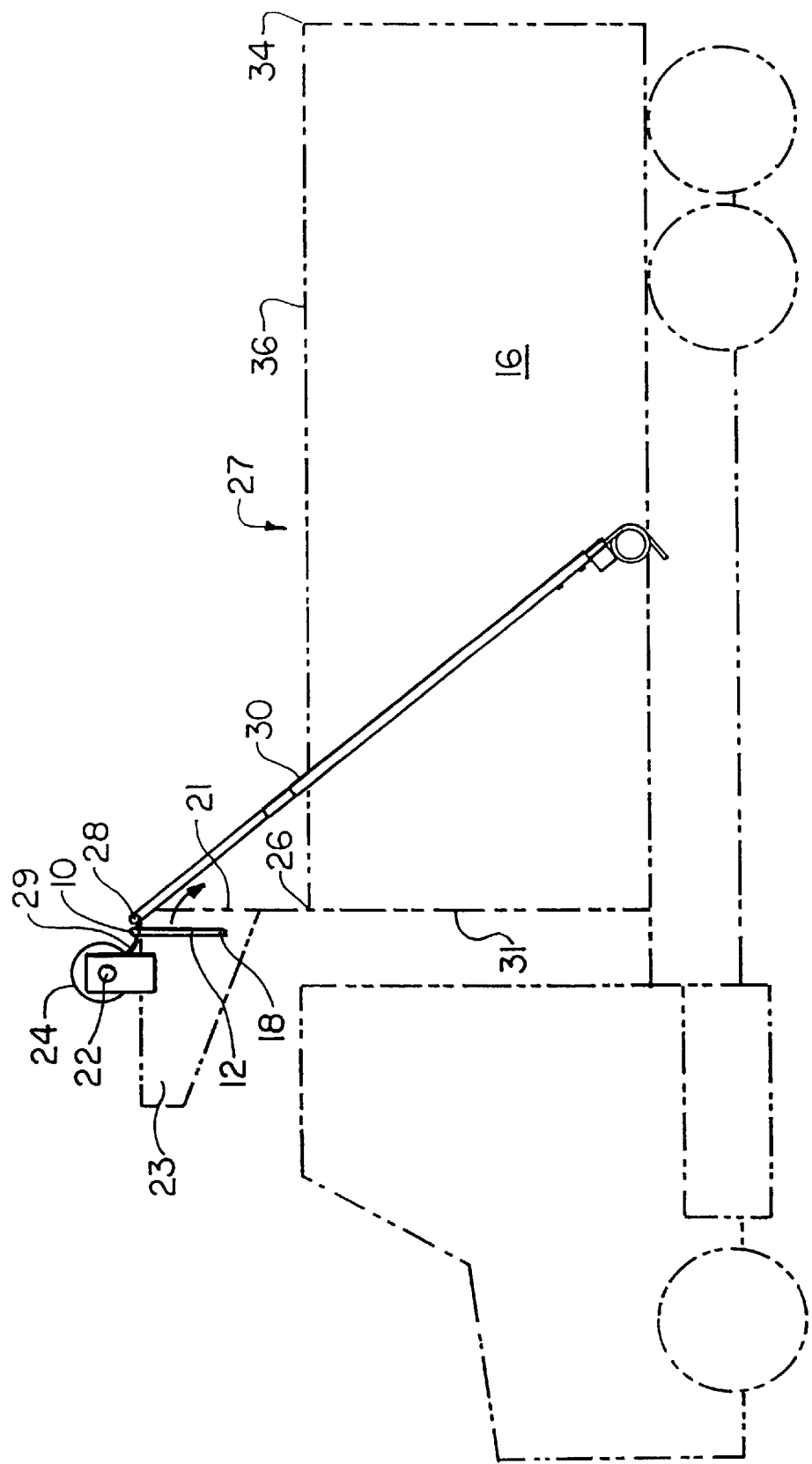
FIG. 2 is a side elevation of the tensioning apparatus on a receptacle with the cover retracted.

Referring to FIGS. 1 and 2, a tensioning bar 10 is mounted at the ends of parallel arms 12, 14, mounted to receptacle 16 at pivot points 18, 20. Tensioning bar 10 is adjacent to cover roller 22 and in slidable communication with a short deployed cover portion 29. Rolled cover 24 is disposed on cover roller 22 and adjacent to tensioning bar 10, above receptacle front top edge 26 and attached to a crossbar 28. Cover roller 22 is often mounted on a cab shield 23, an elevated horizontal surface above receptacle front top edge 26. Alternatively, cover roller 22 can be mounted on a moveable gantry adjacent to receptacle 16 or mounted substantially just above receptacle front top edge 26. Cab shield extension 21 elevates cab shield 23 above receptacle front top edge 26, and may be substantially coplanar with respect to receptacle front side 31. Prior to deployment, substantially all of the cover material 24, 25, 29 is disposed around the cover roller 22 with the exception of the short deployed cover portion 29 to allow attachment with the crossbar 28 and communication with the tensioning bar 10.

Figure 3:
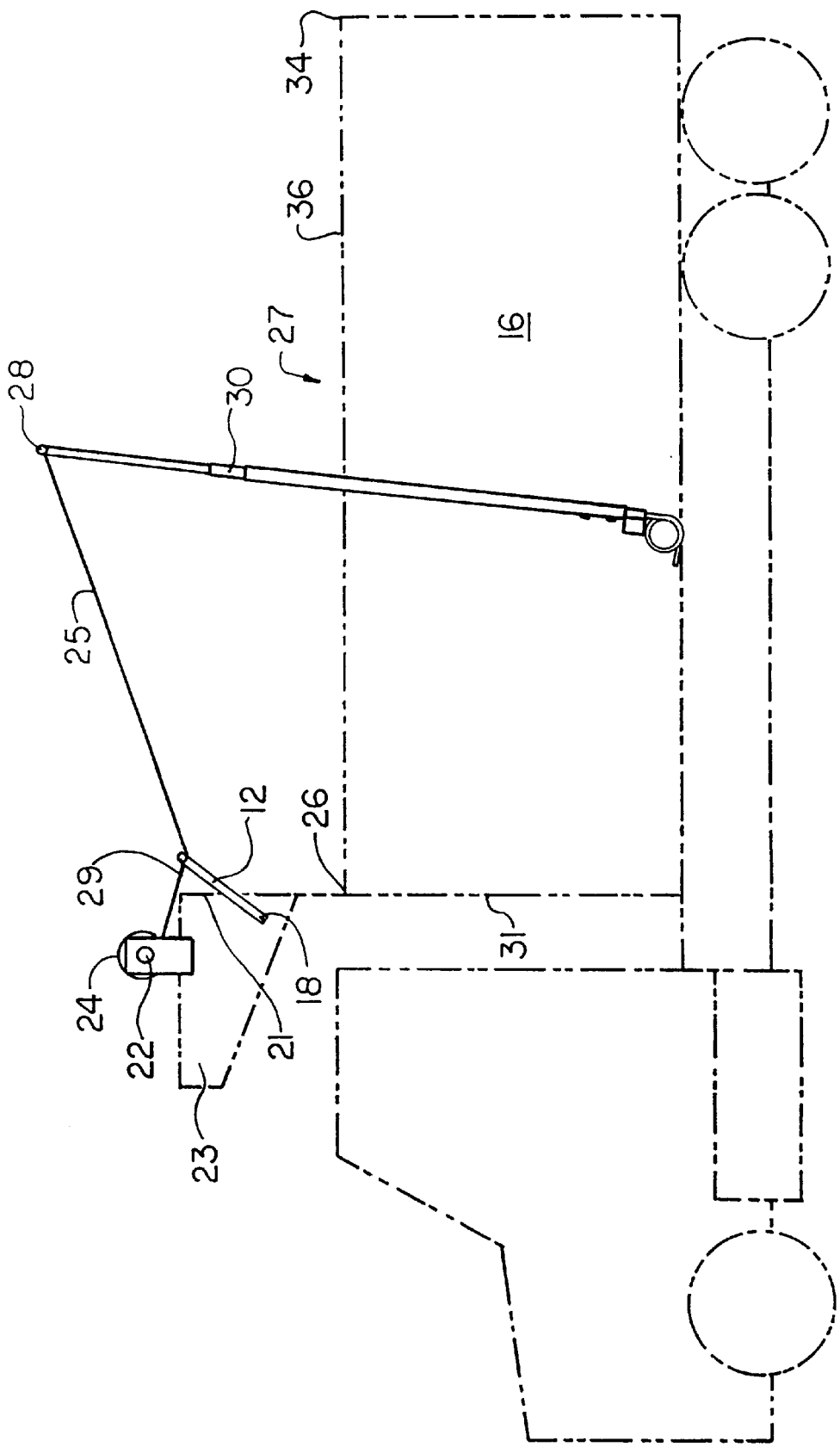
FIG. 3 is a side elevation of the tensioning apparatus on a receptacle with the cover partially deployed.

Crossbar 28 is attached to the ends of a parallel pair of pivot arms 30,32 which permit crossbar 28 to travel an arcuate path between receptacle front top edge 26 and receptacle rear top edge 34. As the cover 24 is drawn by movement of pivot arms 30, 32, cover roller 22 is rotated to allow cover 24 to be disposed in an extended position across the open top 27 defined by receptacle front and rear top edges 26, 34 and receptacle sides 36, 38. While cover 24 is unrolled to allow movement, tensioning bar 10 is urged towards receptacle front top edge 26, disposing cover 24 towards receptacle front top edge 26 as it is deployed and slidably drawn beneath the tensioning bar 10. Referring to FIGS. 1 & 3, as pivot arms 30, 32 move crossbar 28 arcuately towards the rear top edge 34, crossbar 28 is slightly elevated with respect to top edges 26, 34, 36, 38, while tensioning bar 10 disposes deployed cover 25 towards receptacle front top edge 26, maintaining tension in unrolled cover 24 from opposing forces between crossbar 28 and resistance in cover roller 22.

Figure 4:
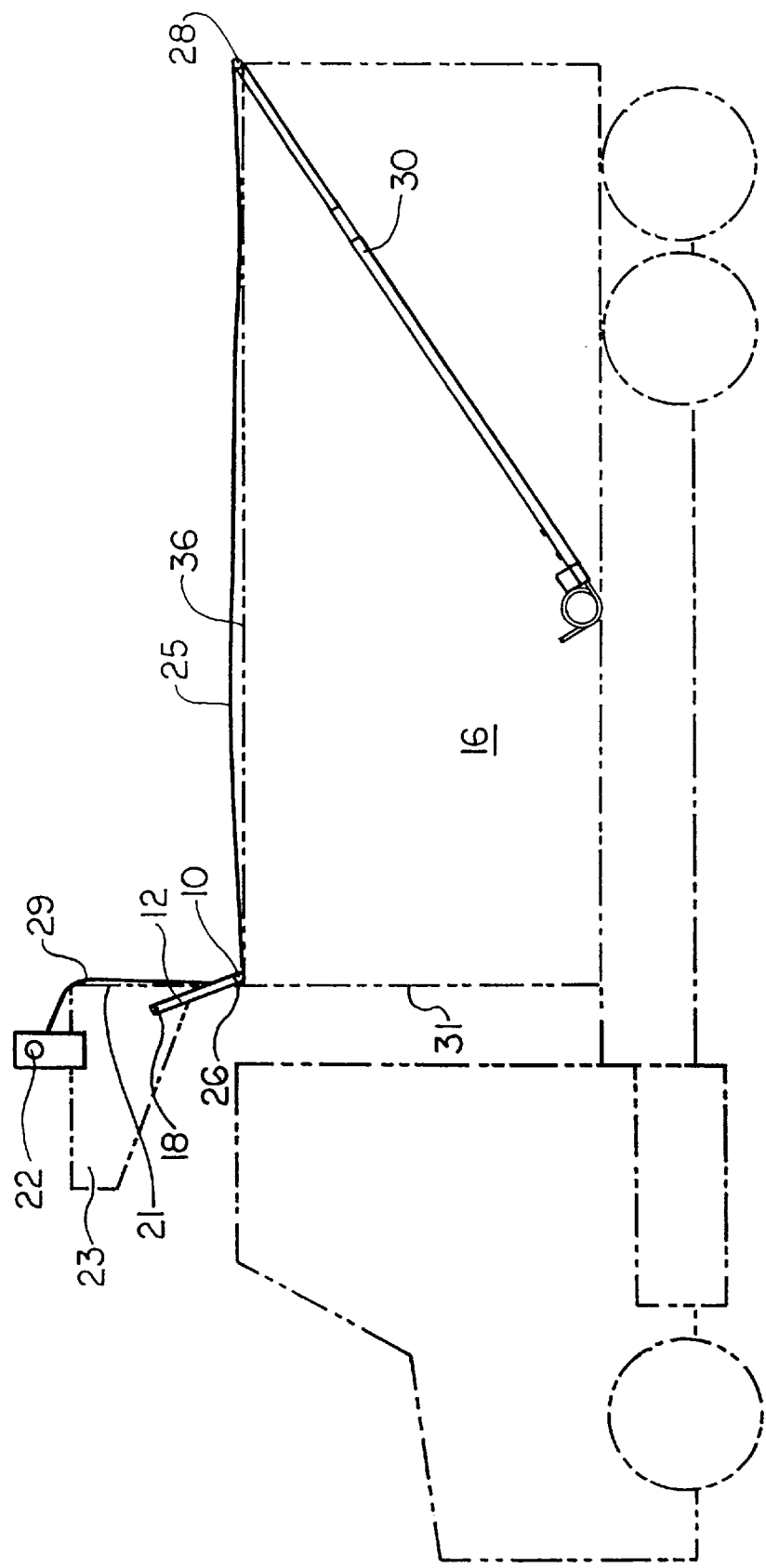
FIG. 4 is a side elevation of the tensioning apparatus on a receptacle with the cover fully deployed.
Figure 5:
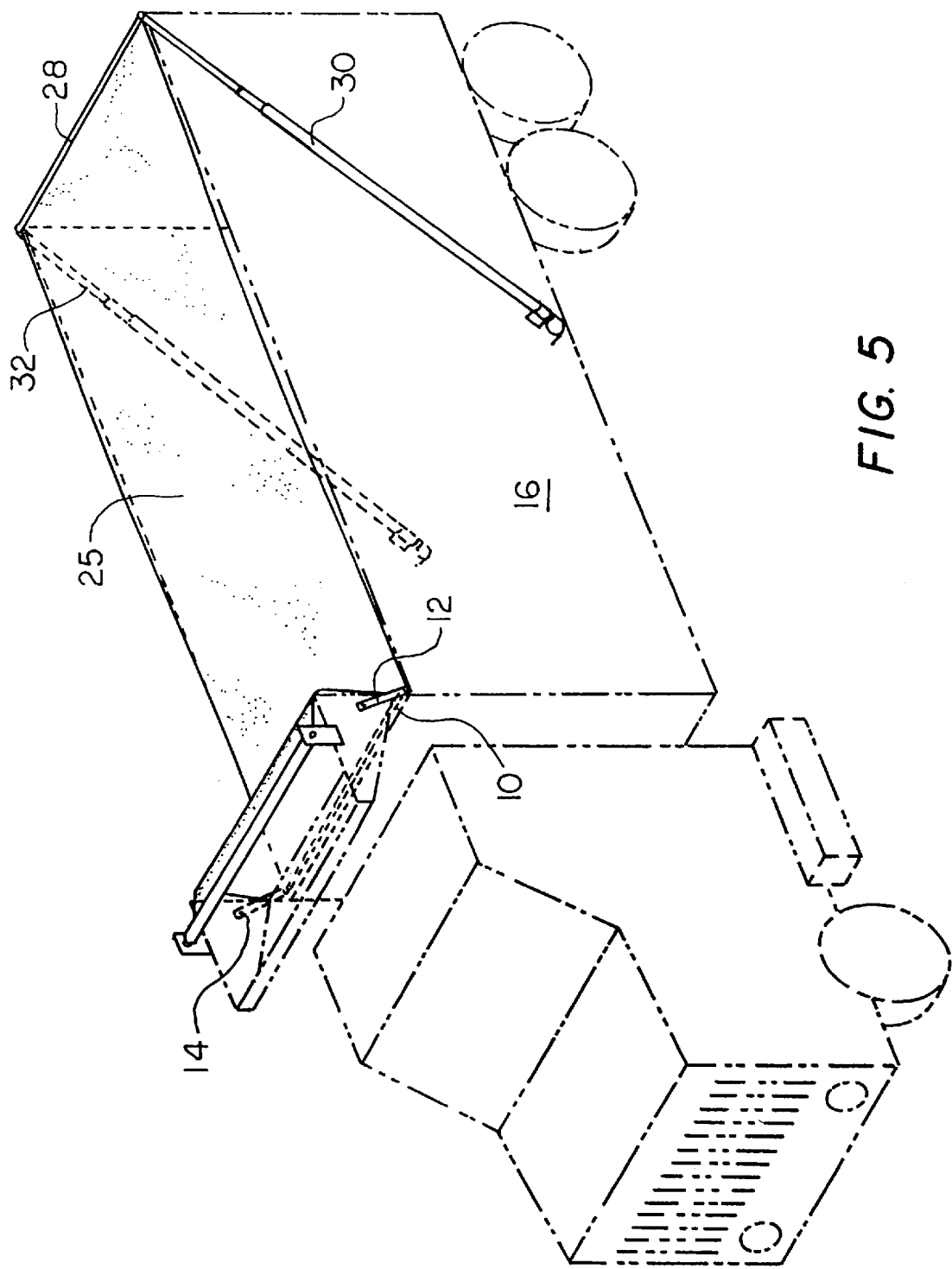
FIG. 5 is a perspective angle view of the tensioning apparatus after cover is completely deployed over a receptacle.

As shown in FIGS. 1 & 4, pivot arms 30, 32 continue arcuate movement such that crossbar 28 is no longer elevated as it approaches receptacle rear top edge 34. Tensioning bar 10 is now urged to receptacle front top edge 26, disposing unrolled cover 25 across the open top 27 such that unrolled cover 25 is fully deployed and substantially in communication with receptacle 16 at top edges 26, 34, 36, and 38, as shown in FIGS. 4 & 5.

Retraction of deployed cover 25 is accomplished by disposing crossbar 28 towards receptacle front top edge 26 by moving pivot arms 30, 32 back through an arcuate path. Deployed cover 25 is drawn back to a rolled position 24 on roller 22, while parallel arms 12, 14 are drawn pivotally towards cab shield 23 as tensioning bar 10 is disposed upwards by the force of the roller 22 movement drawing the cover and the crossbar 28, maintaining tension in the deployed cover 25 as shown in FIGS. 1 & 3.

As crossbar 28 approaches roller 22, most of the deployed cover 25 has been rolled 24 onto the cover roller 22. Referring to FIGS. 1 & 2, tensioning bar 10 is disposed towards the cover roller 22 and the crossbar 28 as it is drawn upwards by the tension in the short deployed cover portion 29 from the fixed position of the roller 22 and crossbar 28. Crossbar 28 comes to rest adjacent to roller 22 as unrolled cover 25 is completely retracted from open top 27. Tensioning bar 10 is disposed between cover 24 and crossbar 28 and is supported against spring bias of pivot points 18, 20 by tension on cover 24 exerted by roller 22 and crossbar 28, now at rest at edge of cab shield 23.

Figure 6:
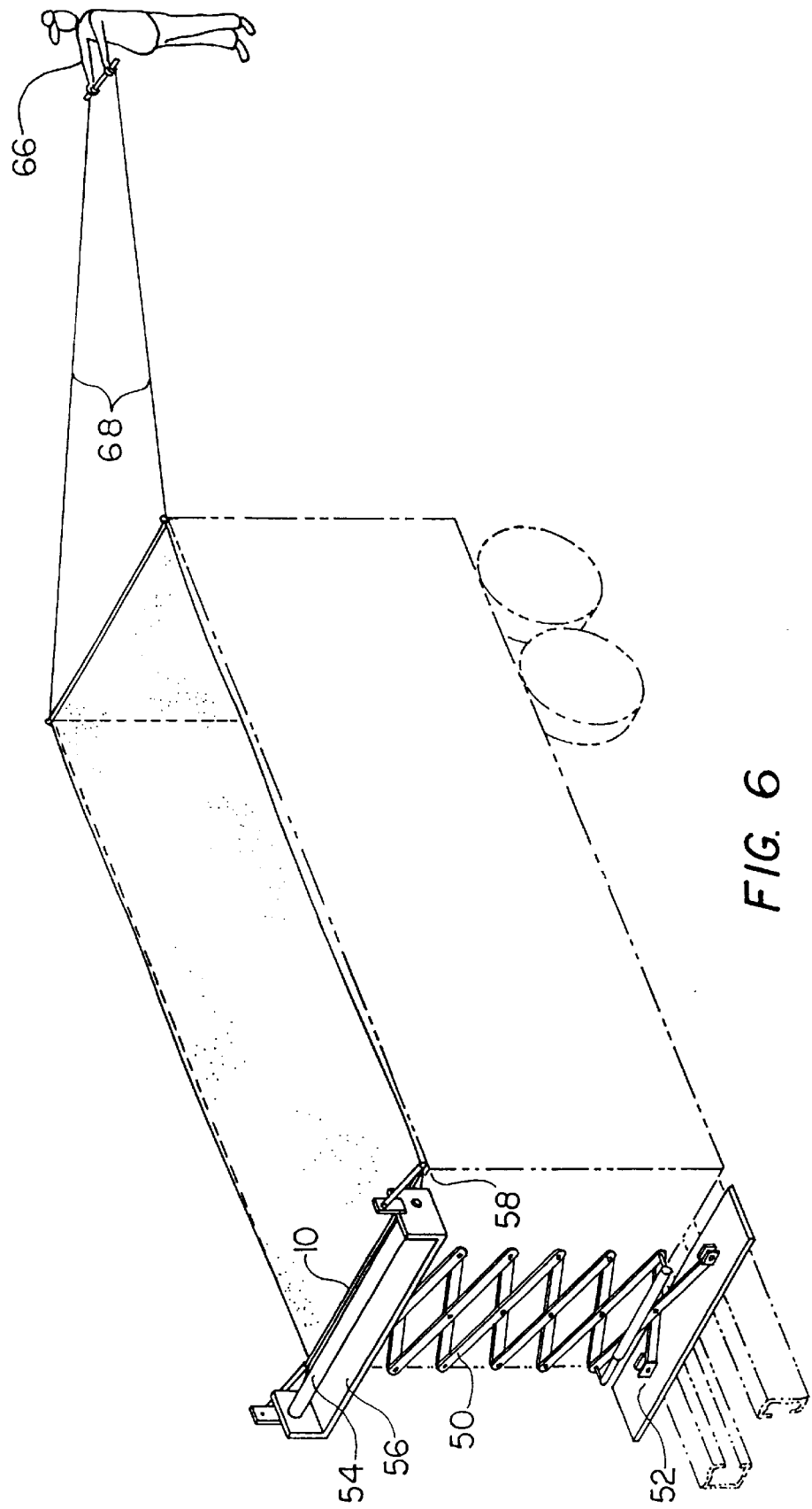
FIG. 6 is a perspective view of the cover deployed from a scissors lift gantry mount rather than a cab shield mount.
Figure 7:
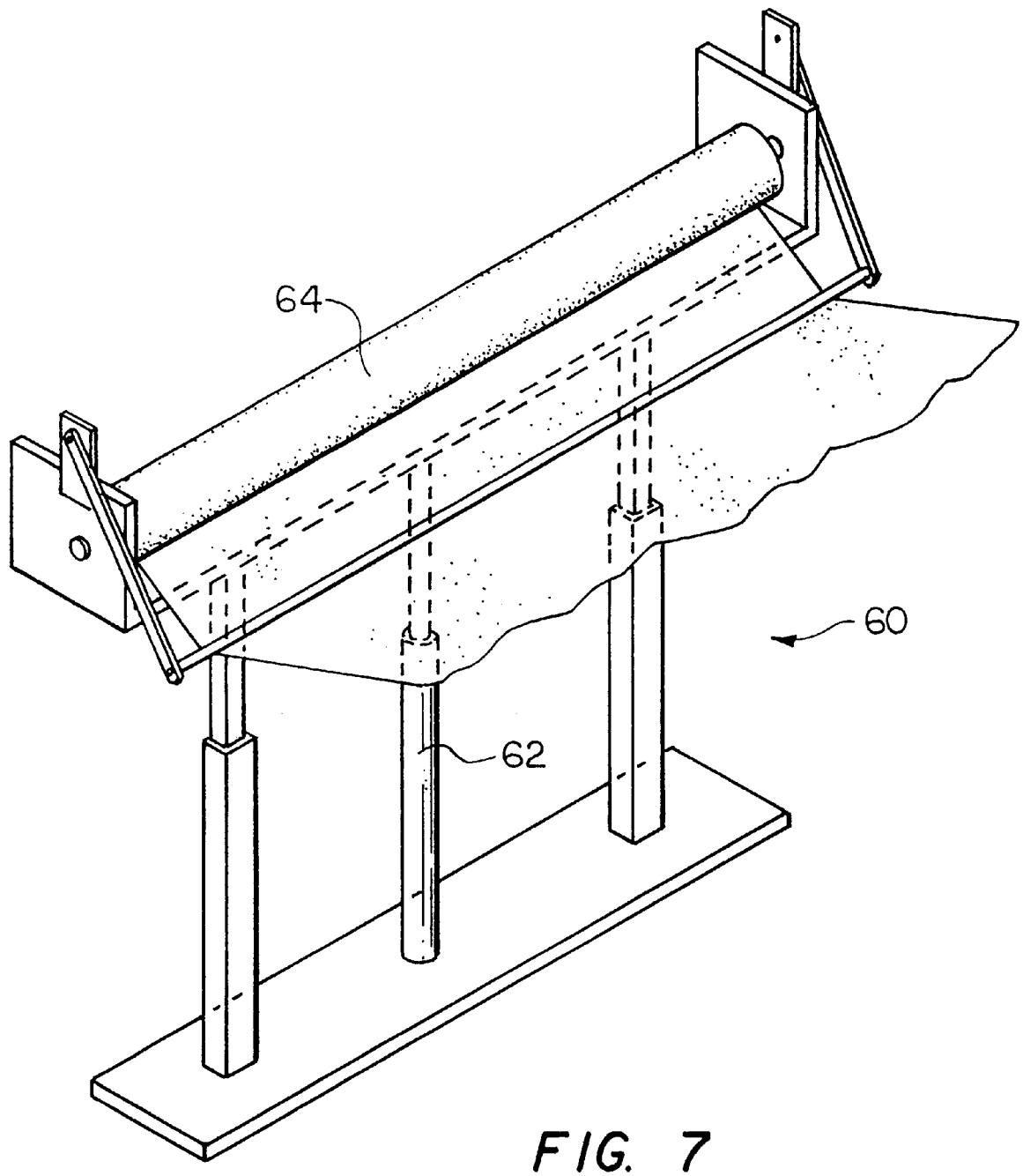
FIG. 7 is a perspective view of a hydraulic cylinder lift mount for the cover roller.

In alternative embodiments the furled cover can be stored on a variable height assembly detached from the receptacle. Referring to FIG. 6, a scissors lift 50 attached to truck body 52 supports the cover roller 54. Tensioning bar 10 is mounted to variable height gantry 56, proximate to receptacle front edge 58. Cover can then be manually drawn by an operator 66 using a pair of tethers 68. Referring to FIG. 7, a hydraulic lift 60 powered by hydraulic cylinder 62 can also be used to mount cover roller 64 independently of a receptacle.

Having described the preferred embodiments of the invention, other embodiments which incorporate the concepts of the presently disclosed invention will be apparent to those of ordinary skill in the art. Therefore, the invention should not be viewed as limited to the disclosed embodiments but rather should be viewed as limited only by the spirit and scope of the appended claims.

I claim:

1. A truck cover tensioning apparatus for an open top receptacle comprising:

a cover having a retracted position and an extended position, said extended position disposing said cover such that it substantially conceals said open top;

said receptacle having a pair of opposing sides, a front side, and a rear side, said sides each having a top edge, said open top defined by said top edges;

a pair of pivotally mounted, spring-biased tension arms;

a tensioning bar attached to said tension arms, said tensioning bar slidably communicating with said cover, said tension arms urging movement of said tensioning bar through a path substantially between a point proximate to said retracted position of said cover and a point proximate to said top edge of said front side such that said cover remains taut while being drawn between said retracted position and said extended position, said tensioning bar disposed at said top edge of said front side when said cover is in said extended position.

2. The truck cover tensioning apparatus as in claim 1 further comprising:

a cab shield defined by a horizontal surface elevated above the top edge of said receptacle front side and spanning said pair of opposing sides.

3. The truck cover tensioning apparatus as in claim 2 wherein:

said retracted position of said cover is on top of said cab shield at said receptacle front side; and said pair of tension arms comprise a pair of substantially parallel arms mounted to said opposing sides of said receptacle of which said cab shield is disposed between.

4. A method of securely covering an open top receptacle with a furled flexible sheet substantially the same size as said open top comprising the steps of:

- affixing a first end of said furled flexible sheet to a first end of said receptacle;
- affixing a second end of a flexible sheet to a movable crossbar adjacent to a first end of said receptacle;
- drawing, in a linear path, said movable crossbar across said open top of said receptacle towards a second end of said receptacle;
- unfurling said flexible sheet to accommodate movement of said crossbar;
- biasing a tensioning bar in slidable communication with said flexible cover towards the open top at said first end of said receptacle such that tension is maintained in said flexible sheet as it is drawn;
- disposing said crossbar at said second end of said receptacle such that said open top is substantially concealed by said cover;
- disposing said tensioning bar at said first end such that said cover is substantially communicating with said receptacle.

5. A method of retracting a flexible cover from concealing an open top receptacle comprising the steps of:

- drawing, in a linear path, a crossbar in communication with a second end of said cover from a second end of said receptacle towards said first end;
- furling said flexible sheet adjacent to said first end as said crossbar is drawn;
- biasing a tensioning bar in slidable communication with said flexible cover towards the open top at said first end of said receptacle such that tension is maintained in said flexible sheet as it is drawn;
- disposing said crossbar at said first end such that said open top is substantially unobstructed by said cover and adjacent to said furled flexible sheet such that said tensioning bar is biased against said flexible sheet.

6. The tensioning apparatus as in claim 1 wherein said retracted position comprises rolling said cover around a rotating shaft.

7. The tensioning apparatus as in claim 1 wherein said cover comprises a tarpaulin of weather resistant materials.

8. The tensioning apparatus as in claim 1 wherein said cover comprises a textile sheet.

9. The tensioning apparatus as in claim 1 wherein said cover comprises a plurality of rigid, flexibly interconnected segments.

10. The tensioning apparatus as in claim 1 wherein said cover is drawn between said retracted and said extended position by a pair of substantially parallel arms.

11. The apparatus as in claim 10 wherein said substantially parallel arms are telescoping.

12. The apparatus as in claim 10 wherein said substantially parallel arms are hydraulically driven.

13. The apparatus as in claim 10 wherein said substantially parallel arms are pneumatically driven.

14. The tensioning apparatus as in claim 1 wherein said cover is on a gantry having a variable height.

15. The method as in claim 4 wherein said drawing from said retracted position to said extended position is through movement of tethers attached to said cover.

* * * * *